United States Patent
Hibino et al.

(10) Patent No.: US 7,326,362 B2
(45) Date of Patent: Feb. 5, 2008

(54) BLOWING AGENT, PREMIX AND PROCESS FOR PREPARING RIGID POLYURETHANE FOAM OR POLYISOCYANURATE FOAM

(75) Inventors: Yasuo Hibino, Saitama (JP); Toshio Hesaka, Saitama (JP); Naoto Takada, Saitama (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 10/244,601

(22) Filed: Sep. 17, 2002

(65) Prior Publication Data

US 2003/0078312 A1    Apr. 24, 2003

(30) Foreign Application Priority Data

Sep. 20, 2001   (JP)   .............................. 2001-287593
Nov. 19, 2001   (JP)   .............................. 2001-353756
Jun. 28, 2002   (JP)   .............................. 2002-190825

(51) Int. Cl.
    *C08G 18/06*   (2006.01)

(52) U.S. Cl. ............... 252/182.24; 252/67; 252/69; 521/170; 521/174

(58) Field of Classification Search ........... 252/182.24, 252/67, 69; 521/170, 174
    See application file for complete search history.

(56) References Cited

U.S. PATENT DOCUMENTS

| | | | | |
|---|---|---|---|---|
| 5,565,497 A | * | 10/1996 | Godbey et al. | ............. 521/131 |
| 5,677,358 A | * | 10/1997 | Lund et al. | ................. 521/131 |
| 5,889,068 A | * | 3/1999 | Madaj et al. | ................ 521/137 |
| 5,895,793 A | | 4/1999 | Kitamura et al. | |
| 5,906,999 A | * | 5/1999 | Valoppi et al. | ............... 521/51 |
| 5,969,198 A | * | 10/1999 | Thenappan et al. | ......... 570/167 |
| 6,372,811 B2 | * | 4/2002 | Singh et al. | ................. 521/131 |
| 6,380,275 B1 | * | 4/2002 | Kruecke et al. | ............ 521/131 |
| 6,451,867 B1 | * | 9/2002 | Bogdan et al. | ............. 521/131 |

FOREIGN PATENT DOCUMENTS

| | | |
|---|---|---|
| JP | 2235982 | 9/1990 |
| JP | 5239251 | 9/1993 |
| JP | 9071628 | 3/1997 |
| JP | 10087774 | 4/1998 |
| JP | 10-139697 | 5/1998 |
| JP | 11 49886 | 2/1999 |
| JP | 11343326 | 12/1999 |
| JP | 2000-281741 | 10/2000 |
| JP | 2003-535157 | 11/2003 |
| JP | 2004-528456 | 9/2004 |
| WO | 98/27145 | 6/1998 |
| WO | WO 99/05204 A1 | 2/1999 |
| WO | 99/61519 | 12/1999 |
| WO | WO 01/68735 | 9/2001 |
| WO | WO 02/092676 A1 | 11/2002 |

OTHER PUBLICATIONS

Database WPI, Section Ch, Week 199342, Derwent Publications Ltd., Article No. XP002231484, 1993.
European Office Action dated Mar. 7, 2006 (Three (3) pages).

* cited by examiner

*Primary Examiner*—John M. Cooney, Jr.
(74) *Attorney, Agent, or Firm*—Crowell & Moring LLP

(57) ABSTRACT

In the present invention, a rigid polyurethane foam or polyisocyanurate foam is prepared by mixing an isocyanate with a premix of a polyol, a blowing agent, a reaction catalyst, a foam stabilizer and other additives, in which 1,1,1,3,3-pentafluoropropane is used as the blowing agent in combination with a vapor pressure depressant therefor that includes at least one compound compatible with 1,1,1,3,3-pentafluoropropane.

11 Claims, No Drawings

BLOWING AGENT, PREMIX AND PROCESS FOR PREPARING RIGID POLYURETHANE FOAM OR POLYISOCYANURATE FOAM

BACKGROUND OF THE INVENTION

The present invention relates to a blowing agent, premix and process for preparing a rigid polyurethane foam or polyisocyanurate foam.

It is well established that a rigid polyurethane foam or polyisocyanurate foam is prepared by reacting a polyol and an isocyanate in the presence of a blowing agent, a reaction catalyst, a foam stabilizer and other additives. More specifically, the isocyanate is generally reacted with a premix of the polyol, the blowing agent, the reaction catalyst, the foam stabilizer and the additives in the industrial production of rigid polyurethane foam or polyisocyanurate foam.

At present, 1,1-dichloro-1-fluoroethane (HCFC-141b) is commonly used as the blowing agent for the preparation of rigid polyurethane foam or polyisocyanurate foam. HCFC-141b has the capability to destroy the ozone layer, even though the capability is low. It has been therefore decided to use HCFC-141b transiently and prohibit the use of HCFC-141b as the blowing agent after the end of the year 2003 in Japan.

SUMMARY OF THE INVENTION

Much attention is now being given to 1,1,1,3,3-pentafluoropropane (HFC-245fa) as an alternative to HCFC-141b, because HFC-245fa contains no chlorine atom in the molecule and thereby has no capability to destroy the ozone layer.

However, there are problems in using HFC-245fa as the blowing agent for the preparation of rigid polyurethane foam or polyisocyanurate foam. That is, HFC-245fa exhibits a low boiling point (15.3° C.) and a lower solubility in a polyol composition so that a premix containing HFC-245fa and the polyol composition has a high vapor pressure and requires careful handling; whereas HCFC-141b exhibits a high boiling point (32° C.) and a higher solubility in a polyol composition owing to chlorine atoms in the molecule, thereby capable of forming a stable premix of HCHC-141b and the polyol composition.

Some reaction systems for the preparation of rigid polyurethane foam or polyisocyanurate foam by the use of HFC-245fa as the blowing agent have been proposed. In one system, HFC-245fa is used alone or in combination with a known low-boiling hydrocarbon, as disclosed in Japanese Laid-Open Patent Publication Nos. 2-235982 and 5-239251. In another system, HFC-245fa is used in combination with a hydrofluorocarbon such as 1,1,1,3,3-pentafluorobutane (HFC-365mfc), 1,1,1,2-tetrafluoroethane (HFC-134a) or the like, as disclosed in Japanese Laid-Open Patent Publication Nos. 9-71628, 10-87774 and 11-49886 and International PatentApplication WO 98/27145. In still another system, HFC-245fa is used in combination with cyclopentane or cyclohexane, as disclosed in Japanese Laid-Open Patent Publication No. 11-343326. Nevertheless, these proposed reaction systems do not provide solutions to the problems that the solubility of HFC-245fa in the polyol composition is so low as to cause a concentration gradient in the premix of HFC-245fa and the polyol composition and that HFC-245fa and the premix of HFC-245fa and the polyol composition have relatively high vapor pressures and are hard to handle.

It is therefore an object of the present invention to provide a blowing agent, premix and process for preparing a rigid polyurethane foam or polyisocyanurate foam, which can overcome the above-mentioned problems.

According to a first aspect of the present invention, there is provided a blowing agent for preparing a rigid polyurethane foam or polyisocyanurate foam, comprising HFC-245fa and a vapor pressure depressant therefor that includes at least one compound compatible with HFC-245fa.

According to another aspect of the present invention, there is provided a premix for preparing a rigid polyurethane foam or polyisocyanurate foam, comprising at least one polyol, a blowing agent, a reaction catalyst, a foam stabilizer and other additives, wherein the blowing agent comprises HFC-245fa and a vapor pressure depressant therefor that includes at least one compound compatible with HFC-245fa.

According to a third aspect of the present invention, there is provided a process for preparing a rigid polyurethane foam or polyisocyanurate foam, comprising reacting a premix of at least one polyol, a blowing agent, a reaction catalyst, a foam stabilizer and other additives with at least one isocyanate, wherein the blowing agent comprises HFC-245fa and a vapor pressure depressant therefor that includes at least one compound compatible with HFC-245fa.

DESCRIPTION OF THE INVENTION

The present invention will be more clearly understood from the following description.

The present invention is based on the finding that both of the vapor pressure of HFC-245fa and the vapor pressure of a premix containing HFC-245fa and a polyol can be reduced by the addition of a specific compound or compounds highly compatible with HFC-245fa. A combination of HFC-245fa and such a specific compound or compounds is fit for a wide range of uses (e.g. as a solvent, an aerosol propellant, a refrigerant and a blowing agent), and is especially suitable as a blowing agent for preparing a rigid polyurethane foam or polyisocyanurate foam as described below.

According to the present invention, a rigid polyurethane foam or polyisocyanurate foam is prepared by reacting a polyol and an isocyanate in the presence of a blowing agent, a reaction catalyst, a foam stabilizer and other additives, in which HFC-245fa is used as the blowing agent in combination with a vapor pressure depressant therefor that includes at least one compound highly compatible with HFC-245fa. In particular, the polyol, the blowing agent, the reaction catalyst, the foam stabilizer and the additives are formed into a premix, and then, the premix and the isocyanate are mixed to cause a foaming reaction.

The amount of HFC-245fa added is not particularly restricted, and can be selected as appropriate depending on the application of the foam to be prepared and the kinds of the polyol, reaction catalyst, foam stabilizer and additives used. The amount of HFC-245fa is preferably in a range of 1 to 80 parts by weight, more preferably 10 to 60 parts by weight, based on 100 parts by weight of the polyol in view of foam properties as well as cost efficiency of the blowing agent.

The vapor pressure depressant aims to provide the effect of reducing the vapor pressure of HFC-245fa. In addition, the vapor pressure depressant can provide the effect of increasing the solubility of HFC-245fa in a polyol composition (i.e., aid HFC-245fa to be dissolved in a polyol composition) so as to reduce not only the vapor pressure of HFC-245fa but also the vapor pressure of the premix. It is thus preferred that the vapor pressure depressant is highly compatible with not only HFC-245fa but also polyol, and has a sufficiently high boiling point for such a vapor pressure reduction effect.

Further, a basic amine catalyst is commonly used as the reaction catalyst for the preparation of rigid polyurethane foam or polyisocyanurate foam. It is therefore preferable that the vapor pressure depressant is not so basic as to have an influence upon the reactivity of the basic amine catalyst, and is stable to a base so that the vapor pressure depressant is not deteriorated in the premix under the influence of the basic amine catalyst.

More specifically, the compound of the vapor pressure depressant has a boiling point higher than or equal to 20° C., is capable of being completely mixed with HFC-245fa, and is in a liquid state at ordinary temperatures. As the compound of the vapor pressure depressant, there may be exemplified by saturated cyclic and acyclic hydrocarbons having at least one hetero atom, such as oxygen, nitrogen, sulfur, phosphorus and the like. Examples of the above hydrocarbons include: carbonates, such as dimethyl carbonate and diethyl carbonate; $C_2$-$C_6$ cyclic and acyclic ketones, such as acetone, ethyl methyl ketone, diethyl ketone and cyclohexanone; $C_2$-$C_6$ cyclic and acyclic ethers, such as dimethyl ether, ethyl methyl ether, diethyl ether, dibutyl ether, t-butyl methyl ether, furan, tetrahydrofuran and tetrahydropyran; cyclic and acyclic acetals, such as dimethoxymethane, diethoxyethane, 1-dimethoxyethane, 1,2-dimethoxyethane, 1,1-diethoxyethane, 2,2-dimethoxypropane and 1,3-dioxolane; esters, such as methyl formate, ethyl formate, n-propyl formate, n-butyl formate, methyl acetate, ethyl acetate, n-propyl acetate, n-butyl acetate, γ-butyrolactone, γ-caprolactone, γ-valerolactone and δ-valerolactone; nitriles, such as acetonitrile, propionitrile and butyronitrile; amides, such as acetamide, N,N-dimethylformamide, N,N-diethylformamide, N,N-dimethylacetamide, N,N-diethylacetamide, 2-pyrrolidone and N-methyl-2-pyrrolidone; sulfoxides, such as sulfoxide, dimethyl sulfoxide and diethyl sulfoxide; sulfolanes, such as sulfolane (tetramethylene sulfone) and 3-methyl sulfolane; phosphoric esters, such as tris(2-chloroethyl)phosphate, tris(2-chloropropyl) phosphate, tris(butoxyethyl)phosphate, trimethyl phosphate, triethyl phosphate, triphenyl phosphate and tris(isopropylphenyl)phosphate; and the like. These compounds may be used alone or in the form of a mixture of any two or more thereof. Among the above compounds, especially preferred are dimethyl carbonate, acetone, methyl formate, γ-butyrolactone, tetrahydrofuran, dimethoxymethane, 1,3-dioxolane, acetonitrile, N-methyl-2-pyrrolidone, sulfoxide, dimethyl sulfoxide, sulfolane, tris(2-chloropropyl)phosphate and triethyl phosphate.

The amount of the vapor pressure depressant added is not particularly restricted. In general, the use of a vapor pressure depressant in a larger amount is more effective in reducing the vapor pressure of an object organic compound. However, when the amount of the vapor pressure depressant added is too large, the blowing agent loses its properties. On the other hand, when the amount of the vapor pressure depressant added is too small, the vapor pressure reduction effect becomes insufficient. Accordingly, the vapor pressure depressant is usually added in an amount of 0.1 to 80 parts by weight, preferably 1 to 50 parts by weight, based on 100 parts by weight of the blowing agent.

The polyol composition is prepared from the polyol, the foam stabilizer, the reaction catalyst, the additives and water (as an auxiliary blowing agent).

The polyol used in the present invention can be any polyalcohol commonly used for the preparation of polyurethane foam or polyisocyanurate foam. There may be exemplified by: polyol compounds prepared by the addition polymerization of a high-functional alcohol (e.g., ethylene glycol, glycerin, trimethylol propane, pentaerythritol, sorbitol, sucrose or bisphenol A) and/or an amine (e.g., an aliphatic amine such as ethylene diamine, or an aromatic amine such as triene diamine) to alkylene oxide (e.g., ethylene oxide and/or propylene oxide); and polyester polyols. These polyols can be used alone or in the form of a mixture of any two or more thereof. It is preferred that the polyol has a high solubility to HFC-245fa so that the vapor pressure of the premix can be reduced more effectively.

The foam stabilizer used in the present invention can be an organosilicone surfactant. Specific examples of the organosilicone surfactants include: SH-193, SH-195, SH-200 and SRX-253 available from Toray Dow Corning Silicone Co., Ltd.; F-230, F-305, F-341 and F-348 available from Shin-Etsu Chemical Co., Ltd.; L-544, L-5310, L-5320, L-5420 and L-5720 available from Nippon Unicar Co., Ltd.; and TFA-4200 and TFA-4202 available from GE Toshiba Silicones Co., Ltd.

The reaction catalyst used in the present invention is not particularly restricted, and can be any catalyst commonly used for the preparation of polyurethane foam or polyisocyanurate foam. Specific examples of the catalysts includes: amine catalysts, such as trimethylamine, triethylamine, N-methylmorpholine, N-ethylmorpholine, trimethylaminoethylpiperazine, N,N-dimethylaminoethylether, pentamethyldiethylenetriamine, N,N-dimethylcyclohexylamine and tetramethylhexamethylenediamine; and organometallic catalysts, such as dibutyltin dilaurate, dilauryltin dichloride, potassium octanoate, cobalt naphthenate and nickel naphthenate. These catalysts may be used alone or in the form of a mixture of any two or more thereof.

Each of the foam stabilizer, the reaction catalyst and water is preferably added in an amount of 0.1 to 3.0 parts by weight based on 100 parts by weight of the polyol.

The additives include a flame retardant. Preferably, the flame retardant is highly compatible with HFC-245fa such that the vapor pressure of the premix can be reduced more effectively. As such a flame retardant, there may be exemplified by phosphoric esters commonly used for the preparation of rigid polyurethane foam or polyisocyanurate foam, such as tris(2-chloroethyl) phosphate, tris(2-chloropropyl) phosphate, tris(butoxyethyl) phosphate, trimethyl phosphate, triethyl phosphate, triphenyl phosphate and tris(isopropylphenyl) phosphate.

The amount of the flame retardant added is usually from 10 to 30 parts by weight based on 100 parts by weight of the polyol. The addition of the flame retardant in a larger amount can provide a greater vapor pressure reduction effect, so that the amount of the vapor pressure depressant can be reduced with increasing the amount of the flame retardant.

The additives may further include an effective amount of surfactant e.g. hydrocarbon surfactant and/or hydrofluorocarbon surfactant in order to increase the solubility of the blowing agent into the polyol composition.

There may be further added in the premix a stabilizing agent for HFC-245fa, such as a-methyl styrene and isopropenyl toluene, as needed.

The premix can be prepared by mixing the blowing agent with the polyol composition. Alternately, the vapor pressure depressant may be individually mixed with the polyol, the reaction catalyst, the foam stabilizer and the other additives including the frame retardant. Further, part of the blowing agent may be added to the isocyanate. Hydrocarbons, hydrofluorocarbons or hydrofluoroethers can be also used as co-blowing agents for HFC-245fa.

The premix is reacted with the isocyanate for the preparation of rigid polyurethane foam or polyisocyanurate foam.

The isocyanate used in the present invention may be aromatic isocyanates, such as diphenylmethane diisocyanate and triene diisocyanate, aliphatic isocyanates, such as isophorone isocyanate, and prepolymers thereof. These isocyanates may be used alone or in the form of a mixture of any two or more thereof.

The amount of the isocyanate added relative to the total amount of the polyol is described in terms of "Isocyanate index", which expresses the percentage of an amount of the isocyanate actually used in the foaming reaction with respect to an amount of the isocyanate theoretically required for reacting with isocyanate-reactive hydrogen in the foaming reaction. Preferably, Isocyanate index is in a range from 80 to 130 for ordinary polyurethane foam and in a range from 150 to 300 for isocyanate-modified polyurethane foam.

The reaction method is not particularly restricted, and may be conducted by any known methods, such as "one-shot process" and "prepolymer process".

The present invention will be described in more detail by reference to the following examples. However, it should be noted that the following examples are only illustrative and not intended to limit the invention thereto.

EXAMPLES 1 to 30

In each example, an ice-cooled 50 ml cylindrical stainless steel container was charged with 10 g of a mixture of HFC-245fa and a vapor pressure depressant as listed in TABLE 1. The vapor pressure depressant was contained in an amount of 10 wt % based on the weight of HFC-245fa. The container was equipped with a pressure sensor: Pressure Transducer VPRNP-A4-1700kPa(abs)-5 (available from Balcom Co., Ltd.), and degassed to place the mixture under vacuum after frozen by liquid nitrogen. Then, the inside of the container was set at a temperature of 50° C. Pressure changes in the container were monitored until the pressure becomes stabilized, while maintaining the temperature at 50° C. The stabilized pressure was measured as a vapor pressure of the mixture of HFC-245fa and the vapor pressure depressant, and an activity coefficient was determined by the following expression: $\gamma=(P/P_{HFC-245fa}) \times 100$, where $\gamma$ is the activity coefficient, $P_{HFC-245fa}$ is the vapor pressure of HFC-245fa by itself ($P_{HFC-245fa}=340$ kPa), and P is the measured vapor pressure of the mixture of HFC-245fa and the vapor pressure depressant. The results are shown in TABLE 1.

COMPARATIVE EXAMPLES 1 and 2

The same procedure as in EXAMPLES 1 to 30 was repeated except that HFC-245 was used alone or in combination with a vapor pressure listed in TABLE 1. The results are shown in TABLE 1.

It is clear from TABLE 1 that the vapor pressure of HFC-245fa was reduced effectively by the addition of the vapor pressure depressant in accordance with the present invention.

EXAMPLES 31 and 33

In each example, 50 g of esterified polyol A (Hydroxy value: 314 mg KOH/g, Viscosity: 2,370 mPa·s/25° C., available from Toho Rika Co., Ltd) was mixed, by stirring, with 10 g of a mixture of HFC-245fa and a vapor pressure depressant as listed in TABLE 2. The vapor pressure depressant was contained in an amount of 10 wt % based on the weight of HFC-245fa. Then, 30 g of the thus-obtained mixture was charged into a 50 ml cylindrical stainless steel container. The container was equipped with a pressure sensor: Pressure Transducer VPRNP-A4-1700kPa(abs)-5 (available from Balcom Co., Ltd.), and degassed to place the mixture under vacuum after frozen in liquid nitrogen. The inside of the container was set at a temperature of 50° C. Pressure changes in the container were monitored until the pressure becomes stabilized, while maintaining the temperature at 50° C. The stabilized pressure was measured as vapor pressure of the mixture of HFC-245fa, the vapor pressure depressant and polyol A, and an activity coefficient was determined from the following expression: $\gamma=(P/P_{HFC-245fa/polyol\ A}) \times 100$, where $\gamma$ is activity coefficient, $P_{HFC-245fa/polyol\ A}$ is the vapor pressure of a mixture consisting of HFC-245fa and polyol A ($P_{HFC-245fa/polyol\ A}=169$ kPa), and P is the measured vapor pressure of the mixture of HFC-245fa, the vapor pressure depressant and polyol A. The results are shown in TABLE 2.

COMPARATIVE EXAMPLE 3

The same procedure as in EXAMPLES 31 to 33 was repeated except that the polyol A was mixed with HFC-245fa alone. The results are shown in TABLE 2.

It is apparent from TABLE 2 that the vapor pressure of the mixture of HFC-245fa and polyol A was reduced effectively by the addition of the vapor pressure depressant in accordance with the present invention.

EXAMPLES 34 to 43

A polyol mixture was prepared by mixing 70 parts by weight of esterified polyol A (Hydroxy value: 314 mg KOH/g, Viscosity: 2,370 mPa·s/25° C., available from Toho Rika Co., Ltd) with 30 parts by weight of etherified polyol B (Hydroxy value: 755 mg KOH/g, Viscosity: 45,000 mPa·s/25° C., available from Mitsui Takeda Chemicals, Inc.), based on 100 parts by weight of the polyol mixture. In each example, the polyol mixture was mixed with a flame retardant, a foam stabilizer: SH-193 (available from Toray Dow Corning Silicone Co., Ltd.), potassium acetate, a reaction catalyst: PC-41 (available from Sankyo Air Products Co., Ltd.), water and a blowing agent, thereby forming a premix having a composition shown in TABLE 3. The flame retardants and the blowing agents used are listed in TABLE 4. In the blowing agent, a vapor pressure depressant was contained in an amount of 10 wt % based on the weight of HFC-245fa. It is noted that TCPP acts not only as the flame retardant but also as the vapor pressure retardant for HFC-245fa in EXAMPLE 34, although listed as the flame retardant in TABLE 4. Then, 50 g of the thus-obtained premix was placed in a 50 ml pressure-resistant glass container with a pressure sensor: Pressure Transducer VPRNP-A4-170OkPa(abs)-5 (available from Balcom Co., Ltd.). The premix was stirred in the air by the use of a magnetic stirrer while maintaining the inside of the container at a temperature of 50° C. Pressure changes in the container were monitored until the pressure becomes stabilized, and then, the vapor pressure was measured. The results are shown in TABLE 4.

COMPARATIVE EXAMPLE 4

The same procedure as in EXAMPLES 34 to 43 was repeated except that HFC-245fa was used alone as a blowing agent. The result is shown in TABLE 4.

As is apparent from TABLE 4, the vapor pressure of the premix was reduced effectively by the addition of the vapor pressure depressant, more specifically by the combined use of the vapor pressure depressant and the flame retardant in accordance with the present invention.

EXAMPLES 44 to 54

A polyol mixture was prepared by mixing 50 parts by weight of esterified polyol A (Hydroxy value: 314 mg KOH/g, Viscosity: 2,370 mPa·s/25° C., available from Toho Rika Co., Ltd) with 50 parts by weight of polyether polyol C (Hydroxy value: 467 mg KOH/g, Viscosity: 3,300 mPa·s/25° C., available from (Sumika Bayer Urethane Co., Ltd.), based on 100 parts by weight of the polyol mixture. In each example, the polyol mixture was mixed with a foam stabilizer: SH-193 (available from Toray Dow Corning Silicone Co., Ltd.), potassium acetate, a reaction catalyst: PC-41 (available from Sankyo Air Products Co., Ltd.), water and a blowing agent formed of HFC-245fa and a vapor pressure depressant, thereby forming a premix with a composition shown in TABLE 5. The vapor pressure depressants contained in the blowing agents are listed in TABLE 6. In each blowing agent, the vapor pressure depressant was contained in an amount of 10 wt % based on the weight of HFC-245fa. Then, the thus-obtained premix mixed, by stirring, with 199 parts by weight of isocyanate: Cosmonate M-200 (available from Mitsui Takeda Chemicals, Inc.) based on 100 parts by weight of the premix, thereby causing a foaming reaction. A gelation time and a rise time were measured as an index of reactivity. The results are shown in TABLE 6.

COMPARATIVE EXAMPLE 5

The same procedure as in EXAMPLES 44 to 54 was repeated except that HFC-245fa was used alone as a blowing agent. The result is shown in TABLE 6.

It is clear from TABLE 6 that there was no deterioration in foaming reactivity (i.e. rate of foaming reaction) due to the addition of the vapor pressure depressant for HFC-245fa.

As described above, it is possible in the present invention to increase the solubility of HFC-245fa in a polyol composition and reduce the vapor pressures of HFC-245fa and a premix of HFC-245fa and a polyol composition by the addition of a specific heteroatom-containing compound or compounds, thereby making the blowing agent and the premix easy to handle.

The entire contents of Japanese Patent Applications No. 2001-287593 (filed on Sep. 20, 2001), No. 2001-353756 (filed on Nov. 19, 2001) and No. 2002-190825 (filed on Jun. 28, 2002) are herein incorporated by reference.

Although the present invention has been described with reference to specific embodiments of the invention, the invention is not limited to the above-described embodiments. Various modification and variation of the embodiment described above will occur to those skilled in the art in light of the above teaching. The scope of the invention is defined with reference to the following claims.

TABLE 1

| | Vapor pressure depressant | Vapor pressure (kPa) | Activity coefficient (%) |
|---|---|---|---|
| Example 1 | 1,3-Dioxolane | 286 | 84 |
| Example 2 | Dimethoxymethane | 291 | 86 |
| Example 3 | o-Methyl formate | 285 | 84 |
| Example 4 | o-Trimethyl acetate | 291 | 86 |
| Example 5 | n-Butyl ether | 300 | 88 |
| Example 6 | Tetrahydrofuran | 289 | 85 |
| Example 7 | t-Butyl methyl ether | 287 | 84 |
| Example 8 | Acetone | 271 | 80 |
| Example 9 | Acetylacetone | 286 | 84 |
| Example 10 | Cyclohexanone | 278 | 82 |
| Example 11 | Methyl isobutyl ketone | 287 | 84 |
| Example 12 | Butyl acetate | 292 | 86 |
| Example 13 | Acetonitrile | 249 | 73 |
| Example 14 | Isobutyronitrile | 267 | 79 |
| Example 15 | N-Methyl-2-pyrrolidone | 277 | 81 |
| Example 16 | Dimethyl carbonate | 283 | 83 |
| Example 17 | Dimethyl formamide | 274 | 81 |
| Example 18 | Sulfolane | 306 | 90 |
| Example 19 | 3-Methylsulfolane | 302 | 89 |
| Example 20 | Dimethylsulfoxide | 276 | 81 |
| Example 21 | Acetonitrile/Acetone (50/50)[1] | 260 | 76 |
| Example 22 | Acetonitrile/Dimethyoxymethane (50/50)[2] | 263 | 77 |
| Example 23 | Tris(2-chloropropyl)phosphate | 314 | 92 |
| Example 24 | Trimethyl phosphate | 297 | 87 |
| Example 25 | Triethyl phosphate | 302 | 89 |
| Example 26 | Methyl formate | 305 | 90 |
| Example 27 | 1,2-Dimethoxyethane | 296 | 87 |
| Example 28 | 1,2-Dimethoxypropane | 294 | 86 |
| Example 29 | 1,1-Diethoxyethane | 287 | 84 |
| Example 30 | γ-Butyrolactone | 290 | 85 |
| Comparative Example 1 | None | 340 | 100 |
| Comparative Example 2 | Cyclopentane | 333 | 98 |

[1]Acetonitrile/Acetone (50/50): equal-weight mixture of acetonitrile and acetone.
[2]Acetonitrile/Dimethyoxymethane (50/50): equal-weight mixture of acetonitrile and dimethoxymethane.

TABLE 2

| | Vapor pressure depressant | Vapor pressure (kPa) | Activity coefficient (%) |
|---|---|---|---|
| Example 31 | Acetonitrile | 134 | 79 |
| Example 32 | Acetone | 137 | 81 |
| Example 33 | Acetonitrile/Acetone (50/50)[1] | 135 | 80 |
| Comparative Example 3 | None | 169 | 100 |

[1]Acetonitrile/Acetone (50/50): Equal-weight mixture of acetonitrile and acetone.

TABLE 3

| Composition | (parts by weight) |
|---|---|
| Polyol A | 70 |
| Polyol B | 30 |
| Flame retardant (see TABLE 4) | 15 |
| Foam stabilizer: SH-193 | 1 |
| Potassium acetate | 2 |
| Reaction catalyst: PC-41 | 2 |
| Water | 2 |
| Blowing agent (see TABLE 4) | 50 |

TABLE 4

| | Blowing agent | Flame retardant | Vapor pressure (kPa) |
|---|---|---|---|
| Comparative Example 4 | HFC-245fa | None | 386 |
| Example 34 | HFC-245fa | TCPP | 368 |
| Example 35 | HFC-245fa + DMSO | TEP | 338 |
| Example 36 | HFC-245fa + DMSO | TCPP | 286 |
| Example 37 | HFC-245fa + DMSO/ Dimethoxymethane[1] | TCPP | 313 |
| Example 38 | HFC-245fa + DMSO/ Tetrahydrofuran[2] | TCPP | 309 |
| Example 39 | HFC-245fa + DMSO/ Methyl formate[3] | TCPP | 321 |
| Example 40 | HFC-245fa + DMSO/ 1,3-Dioxolane[4] | TCPP | 312 |
| Example 41 | HFC-245fa + γ-Butyrolactone | TCPP | 342 |
| Example 42 | HFC-245fa + Sulfolane | TCPP | 346 |
| Example 43 | HFC-245fa + N-methyl-2-pyrrolidone | TCPP | 339 |

DMSO = Dimethyl sulfoxide
TCPP = Tris(2-chloropropyl)phosphate
TEP = Triethylphosphate
[1] DMSO/Dimethoxymethane: equal-weight mixture of DMSO and dimethoxymethane.
[2] DMSO/Tetrahydrofuran: equal-weight mixture of DMSO and tetrahydrofuran.
[3] DMSO/Methyl formate: equal-weight mixture of DMSO and methyl foamate.
[4] DMSO/1,3-Dioxolane equal-weight mixture of DMSO and 1,3-dioxolane.

TABLE 5

| Composition | (parts by weight) |
|---|---|
| Polyol A | 50 |
| Polyol C | 50 |
| Foam stabilizer: SH-193 | 1 |
| Potassium acetate | 2 |
| Reaction catalyst: PC-41 | 2 |
| Water | 2 |
| HFC-245fa | 30 |

TABLE 6

| | Blowing agent | Gelation time (sec) | Rise time (sec) |
|---|---|---|---|
| Comparative Example 5 | HFC-245fa | 34 | 52 |
| Example 44 | HFC-245fa + Acetone | 26 | 50 |
| Example 45 | HFC-245fa + Acetonitrile | 32 | 56 |
| Example 46 | HFC-245fa + Acetone/Acetonitrile[1] | 31 | 58 |
| Example 47 | HFC-245fa + DMSO | 32 | 55 |
| Example 48 | HFC-245fa + DMSO/Dimethoxymethane[2] | 31 | 53 |
| Example 49 | HFC-245fa + DMSO/Tetrahydrofuran[3] | 32 | 52 |
| Example 50 | HFC-245fa + DMSO/Methyl formate[4] | 32 | 55 |
| Example 51 | HFC-245fa + DMSO/1,3-Dioxolane[5] | 31 | 54 |
| Example 52 | HFC-245fa + γ-Butyrolactone | 30 | 53 |
| Example 53 | HFC-245fa + Sulfolane | 33 | 52 |
| Example 54 | HFC-245fa + N-methyl-2-pyrrolidone | 29 | 50 |

[1] Acetone/Acetonitrile: equal-weight mixture of acetone and acetonitrile.
[2] DMSO/Dimethoxymethane: equal-weight mixture of DMSO and dimethoxymethane.
[3] DMSO/Tetrahydrofuran: equal-weight mixture of DMSO and tetrahydrofuran.
[4] DMSO/Methyl formate: equal-weight mixture of DMSO and methyl formate.
[5] DMSO/1,3-Dioxolane: equal-weight mixture of DMSO and 1,3-dioxolane.

What is claimed is:

1. A premix for preparing a rigid polyurethane foam or polyisocyanurate foam, consisting of:
   a blowing agent consisting of 1,1,1,3,3-pentafluoropropane and a vapor pressure depressant therefore in an amount of 1 to 80 parts by weight based on 100 parts by weight of the blowing agent, said vapor pressure depressant being at least one compound compatible with 1,1,1,3,3-pentafluoropropane and selected from the group consisting of dimethyl carbonate, methyl formate, γ-butyrolactone, tetrahydrofuran, dimethyoxymethane, 1,3-dioxolane, acetonitrile, N-methyl-2-pyrrolidone, sulfoxide, dimethyl sulfoxide and sulfolane;
   at least one polyol;
   a reaction catalyst;
   a foam stabilizer;
   at least one additive selected from the group consisting of a flame retardant, a surfactant and an agent for stabilizing 1,1,3,3-pentafluoropropane, said agent for stabilizing 1,1,1,3,3-pentafluoropropane being either α-methyl syrene or isopropenyl toluene; and
   water.

2. The premix according to claim 1, wherein said 1,1,1,3,3-pentafluoropropane is contained in an amount of 1 to 80 parts by weight based on 100 parts by weight of the polyol, and each of the foam stabilizer and the reaction catalyst is contained in an amount of 0.1 to 3.0 parts by weight based on 100 parts by weight of the polyol.

3. The premix according to claim 2, wherein said 1,1,1,3,3-pentafluoropropane is contained in an amount of 10 to 60 parts by weight based on 100 parts by weight of the polyol.

4. The premix according to claim 1, wherein the flame retardant is a phosphoric ester compatible with 1,1,1,3,3-pentafluoropropane.

5. The premix according to claim 4, wherein the phosphoric ester is selected from the group consisting of tris(2-chloroethyl) phosphate, tris(2-chloropropyl) phosphate, tris(butoxyethyl) phosphate, trimethyl phosphate, triethyl phosphate, triphenyl phosphate and tris(isopropylphenyl) phosphate.

6. The premix according to claim 4, wherein the flame retardant is contained in an amount of 10 to 30 parts by weight based on 100 parts by weight of the polyol.

7. The premix according to claim 1, wherein the surfactant is selected from the group consisting of hydrocarbon surfactants and hydrofluorocarbon surfactants.

8. The premix according to claim 1, wherein said at least one compound of the vapor pressure depressant has a boiling point higher than or equal to 20° C. and is capable of being completely mixed with 1,1,1,3,3-pentafluoropropane.

9. The premix according to claim 1, wherein said at least one compound of the vapor pressure depressant includes dimethyl sulfoxide.

10. The premix according to claim 1, wherein said at least one compound of the vapor pressure depressant includes γ-butyrolactone.

11. The premix according to claim 1, wherein the vapor pressure depressant is contained in an amount of 1 to 50 parts by weight based on 100 parts by weight of the blowing agent.

* * * * *